United States Patent [19]

Neer

[11] Patent Number: 5,142,560

[45] Date of Patent: Aug. 25, 1992

[54] WIRETAP DETECTOR AND TELEPHONE LOOP MONITOR

[76] Inventor: Mark J. Neer, 835 Locust, Winnetka, Ill. 60093

[21] Appl. No.: 587,413

[22] Filed: Sep. 25, 1990

[51] Int. Cl.$^5$ ............................................. H04M 1/68
[52] U.S. Cl. ........................................ 379/7; 379/21; 379/30
[58] Field of Search .................. 379/7, 21, 29, 30, 39, 379/35

[56] References Cited

U.S. PATENT DOCUMENTS

| | | | |
|---|---|---|---|
| 1,834,992 | 12/1931 | Almquist | 379/21 |
| 4,658,099 | 4/1987 | Frazer | 379/7 |
| 4,680,783 | 7/1987 | Boeckmann | 379/7 |
| 4,760,592 | 7/1988 | Hensley | 379/7 |

FOREIGN PATENT DOCUMENTS 58-143659  8/1983  Japan ........................................ 379/7

Primary Examiner—Stafford D. Schreyer

[57] ABSTRACT

A novel method and improved system for the continuous detection monitoring of authorized/unauthorized connections/disconnections including loop bridging wiretapping equipment capable of monitoring recording voice and/or data communications on the subscriber's local telephone loop.

In operation the detector monitor displays electrical changes in impedance condition and characteristics on the subscriber's local telephone loop to detect and monitor signaling, switching equipment and telephone lines connecting/disconnecting anywhere on the loop including the central exchange before, during and after the completion of a telephone call continuously.

12 Claims, 4 Drawing Sheets

WIRETAP DETECTOR AND TELEPHONE LOOP MONITOR

BACKGROUND

1. Field of Invention

This invention relates to the detection monitoring of authorized/unauthorized connections/disconnections including loop bridging wiretapping equipment on the subscriber's local telephone loops where electrical changes in loop impedance condition and characteristics occur because of the connections/disconnections of the briding equipment.

2. Description of Prior Art

There are many devices available that have been developed for both legal and illegal wiretapping of telephone communications. A very common type of wiretapping consists of a bridging device that creates a remote extension or drawn loop by connecting an additional telephone line on the subscriber's telephone loop and routing it to an observation monitoring location. This loop bridging wiretapping technique will cause a change in loop impedance condition and characteristics depending on how the tapping is completed.

In the prior art, wiretap detectors exist that utilize microcomputers and processors, various meters, signal generators, tone generators, etc., that detect wiretapping equipment connected to a telephone line but are either simple voltage meters that are ineffective, limited, detachable and defeatable, too expensive and/or complicated equipment that is burdensome and obtrusive to use on a continuous basis or must be installed on a clean line only.

OBJECTS AND ADVANTAGES

This invention presents a new device, method and system that displays connections and disconnections anywhere on the subscriber's local telephone loop including the central exchange of the telephone company before, during and after the completion of a call on a continuous basis. Each telephone call produces a signature or pattern of connections and disconnections. This invention present the first continuous display of normal-/abnormal telephone loop electrical changes in impedance condition and characterization activity resulting from signaling, switching and wiretapping monitoring equipment connecting/disconnecting.

The present invention is easy to use, highly reliable, undetectable, small, portable, and discreet which presents a novel method and an improved system for detecting monitoring authorized/unauthorized connections/disconnections including wiretapping monitoring recording equipment which overcome all of the above mentioned disadvantages of the previously known devices.

It is the object of this invention to show how authorized/unauthorized connections/disconnections including loop bridging wiretapping equipment can be detected and monitored on the subscriber's loop by subscriber's telephone terminal(s) equipped with said invention.

DRAWING FIGURES

Figure 1:
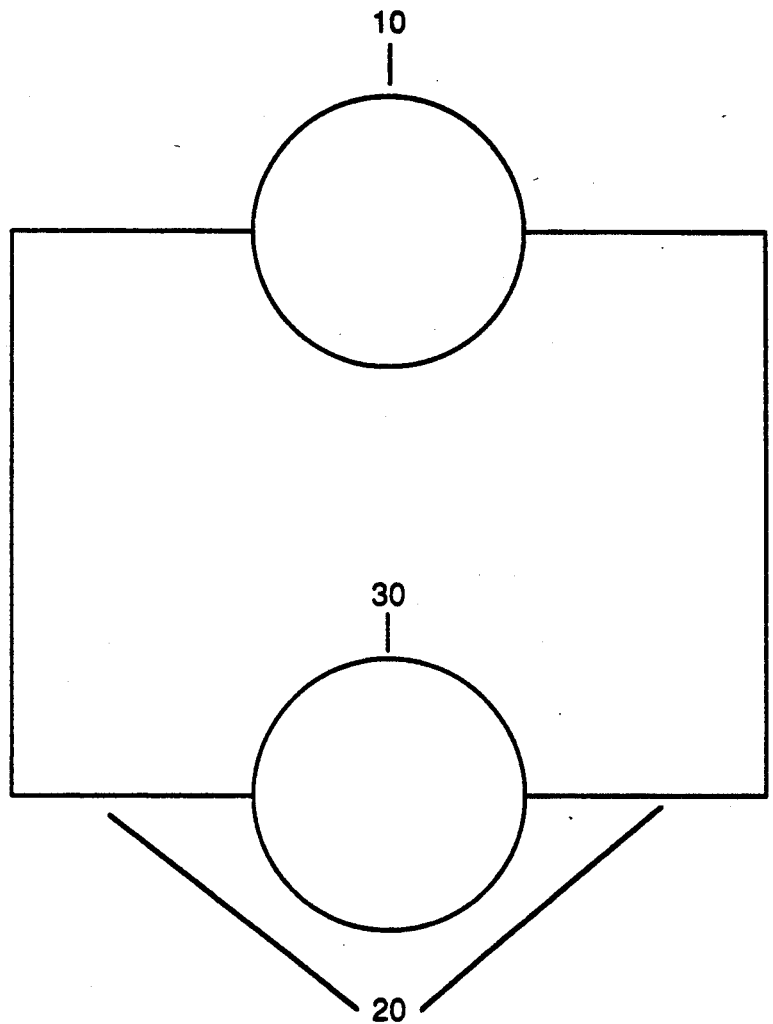
FIG. 1 is a diagram of a local telephone system.

REFERENCE NUMERALS IN DRAWINGS 10 local telephone central exchange
20 subscriber's local telephone loop
30 subscriber's residence telephone terminal(s)
40 capacitive element
50 detector monitor display assembly
60 isolation transformer
70 switching mechanism
80 modular telephone line
90 modular telephone line jack
100 modular telephone interface housing

DESCRIPTION OF INVENTION

This invention presents a novel method and improved system that detects and monitors authorized/unauthorized connections/disconnections including loop bridging wiretapping equipment that causes electrical changes in impedance condition and characteristics on the subscriber's local telephone loop to detect signaling, switching equipment and telephone lines connecting/disconnecting anywhere on the loop including the central exchange continuously.

By continuously monitoring the subscriber's telephone loop impedance condition and characteristics, it is possible to detect normal as well as abnormal connections and disconnections. Connections and disconnections effect changes in impedance characteristics on the subscriber's telephone loop and are the indication of wiretapping monitoring equipment connecting/ disconnecting. By detecting connections/disconnections it is possible to determine authorized/unauthorized connections/disconnections including wiretapping equipment on the loop. The proposed method and system comprises of monitoring the device's display to establish a normal signature or pattern of telephone loop characteristics from an abnormal signature or pattern resulting from additional extensions, either at the subscriber's residence or remotely connecting/disconnecting on the telephone loop.

OPERATION OF THE PREFERRED EMBODIMENT

Further objects and advantages of said invention will become apparent from a consideration of the drawings and ensuing operation of it. Each of the elements included therein can assume several different forms, all of which would be well known to those skilled in the art, and it only be required that they perform the functions set forth herein after.

Referring first to the diagram of FIG. 1, it should be noted that FIG. 1 details a local telephone system. As seen in FIG. 1, a local telephone system comprising of the telephone company's central exchange 10 a subscriber's local telephone loop 20 and a subscriber's residence telephone terminal(s) 30.

Figure 2:
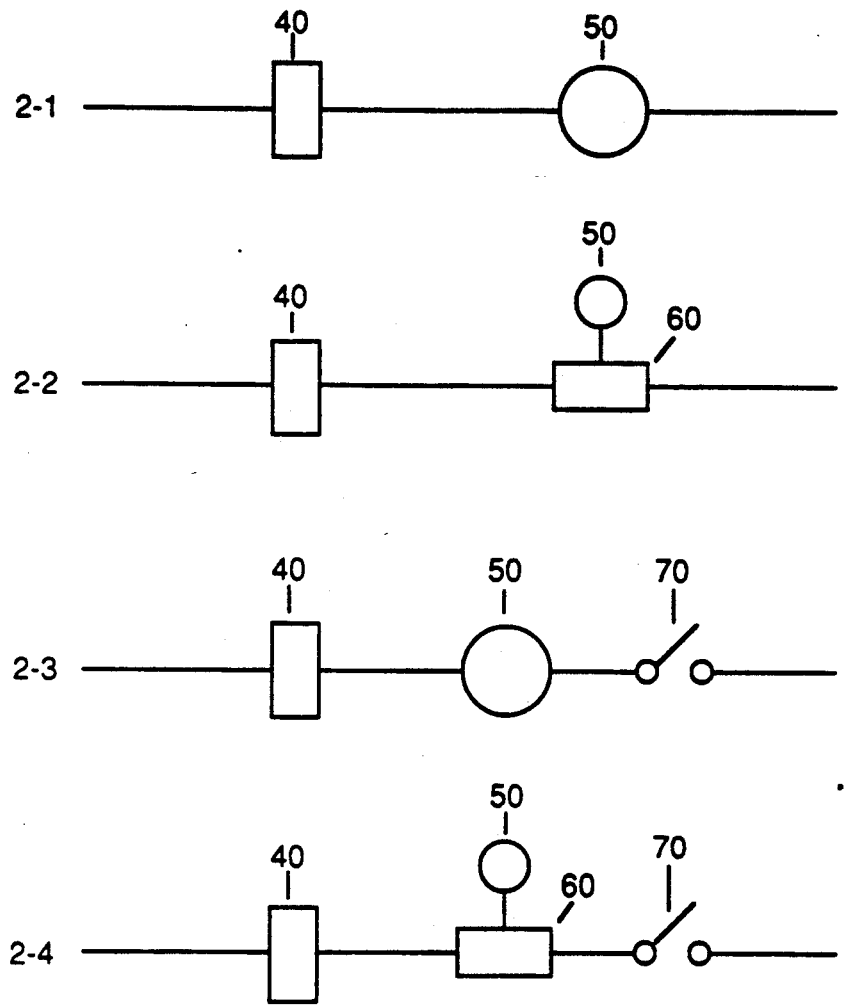
FIG. 2 is a diagram of the wiretap detector and telephone loop monitor in alternate forms, in accordance with the present invention.
Figure 3:
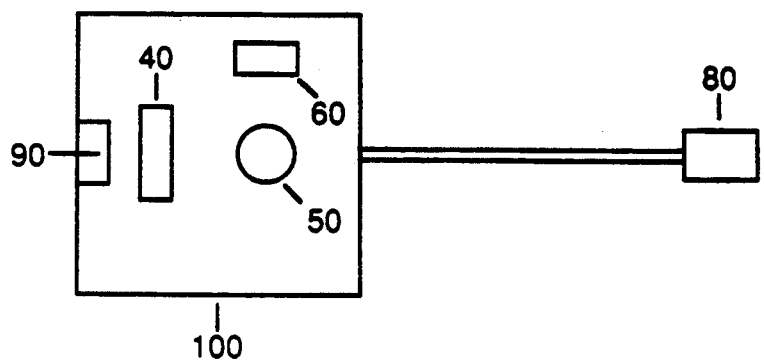
FIG. 3 is a diagram of the preferred assembled invention in accordance with the present invention.
Figure 4:
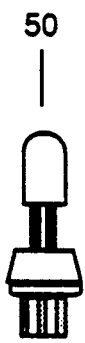
FIG. 4 is a diagram of the detector monitor display socket assembly.

Referring to FIG. 2, there are four presented embodiments of said invention, embodiment 2 is the preferred embodiment. As seen in FIG. 2, embodiment 1 comprising capacitive element 40 detector monitor display assembly 50.

As seen in FIG. 2, preferred embodiment 2 comprising capacitive element 40 isolation transformer 60 display assembly 50.

As seen in FIG. 2, embodiment 3 comprising capacitive element 40 display element 50 switching mechanism 70.

As seen in FIG. 2, embodiment 4 comprising capacitive element 40 isolation transformer 60 display assembly 50 switching mechanism 70.

As seen in preferred embodiment 2, side one of the capacitive element 40 is connected to either the Tip or Ring side of the subscriber's telephone loop 20. Side two of the capacitive element 40 is connected in series to the isolation transformer 60 primary's side one. The isolation transformer 60 primary's side two is then connected to the alternate side of the subscriber's telephone loop 20. The isolation transformer 60 secondary is connected to the display assembly 50.

Once the detector monitor is connected to the loop 20 the device continuously detects and monitors electrical changes in impedance condition and characteristics on the loop 20 reporting each authorized/unauthorized connections/disconnections, as well as tampering and changes in loop signature pattern characteristics.

SUMMARY, RAMIFICATIONS, AND SCOPE

Each connection and disconnection on the subscriber's local telephone loop creates electrical changes in loop impedance condition and characteristics. Each telephone call creates a series of normal connections and disconnections on the loop, the device's display creates a signature or pattern. The system comprises of monitoring the device's display to each cell. By detecting electrical changes on the loop it is possible to establish a normal pattern of loop activity from an abnormal one.

The preferred method and system comprises of connecting and monitoring the display assembly to establish a normal signature or pattern of loop impedance conditions and characteristics from an abnormal one resulting from additional connections/disconnections and tampering on the loop.

The device detects and monitors authorized/unauthorized connections and disconnections before, during and after the completion of a call on a continuous basis.

It would be obvious to those skilled in the art that numerous identifications could be made to the method and system of the present invention without departing from the spirit of the invention, which shall be limited only by the scope of the claims appended hereto.

I claim:

1. An apparatus for detecting the connecting and the disconnecting of an additional telephone line onto the subscriber's telephone loop for the purpose of listening and/or recording, the telephone loop connecting a subscriber with at least one telephone to a central exchange and having a generally constant electrical impedance, comprising:

(a) a capacitive element for detecting changes to said generally constant electrical impedance;
   (b) display means cooperating with and connected to said capacitive element for visually showing that a change has been detected by said capacitive element; and
   (c) means for connecting the apparatus to the telephone loop.

2. The apparatus of claim 1, wherein said capacitive element is a capacitor connected in series to the telephone loop.

3. The apparatus of claim 1, wherein said display means is a LED.

4. The apparatus of claim 1, wherein said means to connect comprises a quick connect/disconnect line and jack.

5. An apparatus for continuously monitoring changes in impedance caused by the connecting or the disconnecting of an additional impedance source to a telephone loop connecting a subscriber with at least one telephone to a central exchange and having a generally constant electrical impedance, comprising:

(a) a capacitive element for detecting changes to the generally constant electrical impedance;
   (b) an isolation transformer having primary and secondary windings, said primary windings being connected to said capacitive element;
   (c) display means connected to said secondary windings for visually showing that a change has been detected by said capacitive element; and
   (d) means for connecting the apparatus to the telephone loop.

6. The apparatus of claim 5, wherein said capacitive element is a capacitor connected in series to the telephone loop.

7. The apparatus of claim 5, wherein said display means is a LED.

8. The apparatus of claim 5, wherein said means to connect comprises a quick connect/disconnect line and jack.

9. The apparatus of claim 1 wherein said means for connecting the apparatus to the telephone loop additionally includes a switching mechanism connected in series with said capacitive element to the telephone loop.

10. The apparatus of claim 9, wherein said display means comprises an easily removable/replaceable LED mounted in a socket assembly.

11. The apparatus of claim 5 wherein said means for connecting the apparatus to the telephone loop additionally includes a switching mechanism connected in series with said capacitive element to the telephone loop.

12. The apparatus of claim 11, wherein said display means comprises an easily removable/replaceable LED mounted in a socket assembly.

* * * * *

UNITED STATES PATENT AND TRADEMARK OFFICE
CERTIFICATE OF CORRECTION

PATENT NO. : 5,142,560
DATED : August 25, 1992
INVENTOR(S) : Mark J. Neer

It is certified that error appears in the above-identified patent and that said Letters Patent is hereby corrected as shown below:

Column 1, Line 13, change 'briding' to - bridging - .

Column 1, Line 30, change 'detachable' to - detectable - .

Column 1, Line 43, change 'present' to - presents - .

Column 1, Line 46, change 'characterization' to - characteristic - .

Column 3, Line 31, change 'cell' to - call - .

Column 3, Line 45, change 'identifications' to - modifications - .

Signed and Sealed this

Second Day of November, 1993

Attest:

BRUCE LEHMAN

Attesting Officer

Commissioner of Patents and Trademarks